(12) United States Patent
Cheng

(10) Patent No.: US 10,788,695 B2
(45) Date of Patent: Sep. 29, 2020

(54) LIQUID CRYSTAL DISPLAY PANEL

(71) Applicant: WUHAN CHINA STAR OPOELECTRONICS TECHNOLOGY CO., LTD., Wuhan, Hubei (CN)

(72) Inventor: Yan Cheng, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/485,175

(22) PCT Filed: Apr. 22, 2019

(86) PCT No.: PCT/CN2019/083592
§ 371 (c)(1),
(2) Date: Aug. 12, 2019

(87) PCT Pub. No.: WO2020/107779
PCT Pub. Date: Jun. 4, 2020

(65) Prior Publication Data
US 2020/0201105 A1  Jun. 25, 2020

(30) Foreign Application Priority Data

Nov. 28, 2018 (CN) .......................... 2018 1 1437528

(51) Int. Cl.
G02F 1/1333 (2006.01)
G02F 1/1335 (2006.01)
G02F 1/13357 (2006.01)

(52) U.S. Cl.
CPC .. *G02F 1/133308* (2013.01); *G02F 1/133512* (2013.01); *G02F 1/133553* (2013.01); *G02F 1/133605* (2013.01); *G02F 1/133606* (2013.01)

(58) Field of Classification Search
CPC ........... G02F 1/133605; G02F 2202/28; G02F 1/133308; G02F 1/133606; G02F 1/133512; G02F 1/133553
See application file for complete search history.

(56) References Cited

U.S. PATENT DOCUMENTS

| | | | |
|---|---|---|---|
| 2004/0212555 A1* | 10/2004 | Falco | G06F 1/1626 345/50 |
| 2010/0315570 A1* | 12/2010 | Mathew | G06F 1/1637 349/58 |

FOREIGN PATENT DOCUMENTS

CN         206741147 U  * 12/2017

\* cited by examiner

*Primary Examiner* — Jia X Pan
(74) *Attorney, Agent, or Firm* — Mark M. Friedman

(57) ABSTRACT

The present invention provides a liquid crystal display panel which has a via hole region and a display region. The liquid crystal display panel includes a backlight film layer. The backlight film layer includes a reflective plate and a light guiding plate arranged in sequence. In the via hole region, a black light-shielding adhesive is attached to the reflective plate. The reflective plate includes a first reflective sheet and a second reflective sheet which is bent upward. The second reflective sheet fixes the backlight film layer by the upward bending of the second reflective sheet. The black light-shielding adhesive includes a first black light-shielding adhesive portion and a second black light-shielding adhesive portion which is bent upward. The second black light-shielding adhesive portion is bent upward to form a black wall to cover the light guiding plate.

18 Claims, 1 Drawing Sheet

LIQUID CRYSTAL DISPLAY PANEL

1. FIELD OF DISCLOSURE

The present invention relates to a field of display panels and in particular, to a liquid crystal display panel.

2. DESCRIPTION OF RELATED ART

In the past two years, there is an increasing demand for full screen products on the market. Among the full screen products, a notch display and a droplet notch display are the mainstream products on the market. A main feature of the full screen products is a higher screen ratio. At present, there is a demand in pursuing an even more higher screen ratio. Although there are no such full screen products ready for mass production on the market, industries are working on developing this kind of products. The idea is to design a via hole in the screen for placing a front camera lens and hide a camera module inside a panel. An in-plane via hole technology is developed accordingly, whereby an effective display area is increased, and a screen ratio of a display screen is raised. In addition, since a non-display area can be reduced, a total size of the display screen is effectively reduced, thus allowing easy gripping and improving user experience.

In a case of a liquid crystal display panel having a backlight module, which is, for example, the one shown in FIG. 1. FIG. 1 is a schematic cross-sectional view taken along a via hole of a conventional liquid crystal display panel. In the drawing, from bottom to top, a reflective plate 11, a light guiding plate 12, a light diffusion sheet 13, a lower brightness enhancing layer 14, an upper brightness enhancing layer 15, a lower polarizing sheet 2, a thin film transistor (TFT) layer 3, a color filter substrate 4, an upper polarizing sheet 5, and a black matrix 6. A camera module 9 is disposed under the via hole. The liquid crystal display panel further includes a display region and a via hole region 8. The via hole region 8 includes a viewing hole region 81, a boundary region 82, and a backlight hole region 83.

The via hole leads to an increased risk of light leakage around a periphery of the via hole. A conventional plastic-iron integrated structure is used for preventing light leakage. However, this method also widens an overall black matrix at the via hole. In other words, the boundary region is made wide. This method not only has complicated steps, but also increases costs in respect of machines and raw materials.

Furthermore, when a screen is displayed normally, a dark non-display circle is at the boundary region, resulting in an unattractive appearance of the display.

Therefore, it is necessary to develop a new liquid crystal display panel to overcome the existing problems in conventional techniques.

Please be noted that, the "Background" section is only intended to enhance a reader's understanding of the present invention, and thus the disclosure of the "Background" section may contain some prior art that is not known to those skilled in the art. The content disclosed in the "Background" section does not represent the problem to be solved by one or more embodiments of the present invention, nor does it mean that it is known or recognized by those skilled in the art prior to the filing of the present application.

SUMMARY

It is an objective of the present invention to provide a liquid crystal display panel which can solve existing problems in prior art, such as an overly wide black matrix at a via hole of a display panel and a troublesome manufacturing process.

Accordingly, the present invention provides a liquid crystal display panel, provided with a via hole region and a display region, the liquid crystal display panel comprising: a backlight film layer, a lower polarizing sheet, a thin film transistor (TFT) layer, a color filter substrate, and an upper polarizing sheet arranged in sequence, the backlight film layer comprising a reflective plate, a light guiding plate, a light diffusion sheet, a lower brightness enhancing layer, and an upper brightness enhancing layer arranged in sequence, wherein in the via hole region, a black light-shielding adhesive is attached to a lower surface of the reflective plate, the reflective plate comprises a first reflective sheet and a second reflective sheet which is bent upward, the second reflective sheet fixes the backlight film layer by the upward bending of the second reflective sheet, the black light-shielding adhesive comprises a first black light-shielding adhesive portion and a second black light-shielding adhesive portion which is bent upward, and the second black light-shielding adhesive portion is bent upward to form a black wall to cover the light guiding plate.

According to one embodiment of the present invention, in the via hole region, a first black double-sided adhesive sheet is disposed between the light guiding plate and the light diffusion sheet.

According to one embodiment of the present invention, in the via hole region, a second black double-sided adhesive sheet is disposed between the light diffusion sheet and the lower brightness enhancing layer.

According to one embodiment of the present invention, in the via hole region, a third black double-sided adhesive sheet is disposed between the lower brightness enhancing layer and the upper brightness enhancing layer.

According to one embodiment of the present invention, in the via hole region, a fourth black double-sided adhesive sheet is disposed between the upper brightness enhancing layer and the lower polarizing sheet. Through such arrangement, these black double-sided adhesive sheets can serve as a support.

According to one embodiment of the present invention, a length of the first black light-shielding adhesive portion is greater than a thickness of the second reflective sheet.

According to one embodiment of the present invention, a length of the first black light-shielding adhesive portion is less than a sum of a thickness of the second reflective sheet and a length of the first black double-sided adhesive sheet.

According to one embodiment of the present invention, in the via hole region, the sum of a length of the second reflection sheet and a length of the first reflective sheet is less than a radius of the via hole region.

According to one embodiment of the present invention, a length of the second reflective sheet is equal to a thickness of the backlight film layer.

According to one embodiment of the present invention, a length of the second black light-shielding adhesive portion is equal to a sum of a thickness of the first reflective sheet and a thickness of the light guiding plate.

According to one embodiment of the present invention, the via hole region is made by laser drilling.

According to one embodiment of the present invention, a terminal device is provided, comprising: a body, the liquid crystal display panel of any embodiment of the present invention disposed on the body, wherein a camera module is disposed on the body, and the camera module is disposed under the via hole region of the liquid crystal display panel.

Advantages of the present invention:

The present invention provides a liquid crystal display panel, in which the black double-sided adhesive sheets are added as a support between the films/layers of the backlight module at the via hole region, and the reflective plate is virtually cut to form a circle at the via hole. The reflective plate is bent upward along a circumference of the cut-out circle, and is bent upward to form a black wall to cover the light guide plate. This arrangement can avoid light leakage and is simple and easy, greatly reducing costs and saving production time. In addition, this arrangement makes an overall black matrix very narrow, making an appearance of the display more beautiful.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

Figure 1:
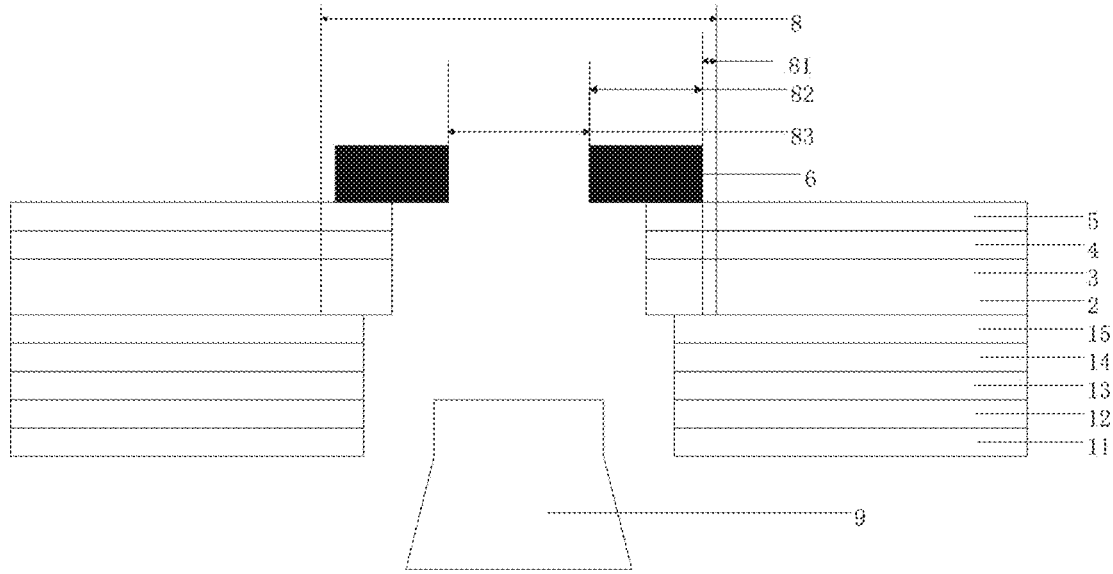
FIG. 1 is a schematic cross-sectional view taken along a via hole of a conventional liquid crystal display panel.

The technical solutions in the embodiments of the present invention are clearly and completely described in the following with reference to the accompanying drawings. It is obvious that the described embodiments are only a part of the embodiments of the present invention, but not all embodiments. All other embodiments obtained by those skilled in the art based on the embodiments of the present invention without creative efforts are within the scope of the present invention.

The specific structural and functional details disclosed herein are merely representative and are for the purpose of describing exemplary embodiments of the invention. The present invention may, however, be embodied in many alternative forms and should not be construed as being limited only to the embodiments set forth herein.

In the description of the present invention, it is to be understood that directional terms such as "center", "lateral", "upper", "lower", "left", "right", "vertical", "horizontal", "top", "bottom", "inside", "outside" indicating orientations or positional relationship based on the drawings are merely for the convenience of describing the present invention and simplifying the description, and do not indicate or imply that the device or the components must have a particular orientation, or are constructed and operated in a particular orientation, and thus are not to be construed as limiting the invention. Furthermore, the terms "first" and "second" are used for descriptive purposes only and are not to be construed as indicating or implying a relative importance or implicitly indicating the number of elements indicated. Thus, elements defined as "first" or "second" may include one or more of the elements either explicitly or implicitly. In the description of the present invention, the meaning of "multiple" is two or more unless otherwise specified. In addition, the term "comprises" and its variations are intended to a non-exclusive inclusion.

In the description of the present invention, it should be noted that, unless otherwise explicitly defined, the terms "installation". "coupled", and "connected" are to be understood broadly, and may indicate, for example, elements are fixedly connected, detachably connected, integrally connected, mechanically connected, electrically connected, directly connected, or connected through an intermediate medium, or internal spaces of two elements communicate with each other. The specific meaning of the above terms in the present invention can be understood by those skilled in the art on a case-by-case basis.

The terminology used herein is for the purpose of describing particular embodiments. Unless otherwise specified, the singular forms "a", "an" are intended to encompass situations of plural forms. It is also to be understood that the terms "comprising" and/or "including" are used to mean the presence of the described features, integers, steps, operations, units, and/or components, but do not exclude the presence or addition of one or more other features, integers, steps, operations, units, components, and/or combinations thereof.

First Embodiment

Figure 2:
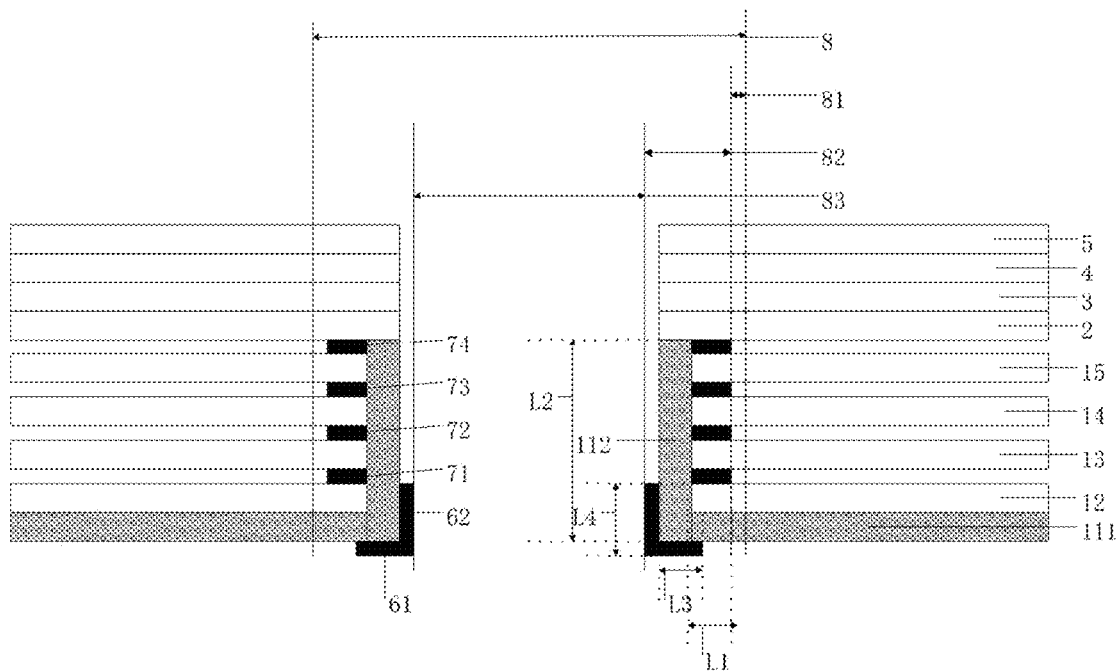
FIG. 2 is a schematic cross-sectional view taken along a via hole of a liquid crystal display panel according to a first embodiment of the present invention.

Referring to FIG. 2, the present invention provides a liquid crystal display panel. The liquid crystal display panel is provided with a via hole region 8 and a display region. The liquid crystal display panel comprising:

a backlight film layer, a lower polarizing sheet 2, a thin film r (TFT) layer 3, a color filter substrate 4, and an upper polarizing sheet 5 arranged in sequence. The lower polarizing sheet 2 is disposed on the backlight film layer. The TFT layer 3 is disposed on the lower polarizing sheet 2. The color filter substrate 4 is disposed on the TFT layer 3. The upper polarizing sheet 5 is disposed on the color filter substrate 4.

The backlight film layer comprises a reflective plate, a light guiding plate 12, a light diffusion sheet 13, a lower brightness enhancing layer 14, and an upper brightness enhancing layer 15 arranged in sequence. The light guiding plate 12 is disposed on the reflective plate. The light diffusion sheet 13 is disposed on the light guiding plate 12. The lower brightness enhancing layer 14 is disposed on the light diffusion sheet 13. The upper brightness enhancing layer 15 is disposed on the lower brightness enhancing layer 14.

The reflective plate comprises a first reflective sheet 111 and a second reflective sheet 112 which is bent upward. In the via hole region, the sum of a length L1 of the first reflective sheet 111 8 and a length L2 of the second reflection sheet 112 is less than a radius of the via hole region 8. A length of the second reflective sheet 112 is equal to a thickness of the backlight film layer. The second reflective sheet 112 fixes the backlight film layer by the upward bending of the second reflective sheet 112.

A black light-shielding adhesive is attached to a lower surface of the reflective plate. The black light-shielding adhesive comprises a first black light-shielding adhesive portion. 61 and a second black light-shielding adhesive portion 62 which is bent upward.

In a via hole region 8, a first black double-sided adhesive sheet 71 is disposed between the light guiding plate 12 and the light diffusion sheet 13, and a second black double-sided adhesive sheet 72 is disposed between the light diffusion sheet 13 and the lower brightness enhancing layer 14, and a third black double-sided adhesive sheet 73 is disposed between the lower brightness enhancing layer 14 and the upper brightness enhancing layer 15, and a fourth black double-sided adhesive sheet 74 is disposed between the upper brightness enhancing layer 15 and the lower polarizing sheet 2. The via hole region is made by laser drilling.

The black double-sided adhesive sheets disposed between the films/layers of the backlight module not only provides a light-shielding function, but also supports the films/layers.

A length L3 of the first black light-shielding adhesive portion 61 is greater than a thickness of the second reflective sheet 112. The length L3 of the first black light-shielding adhesive portion 61 is less than a sum of a thickness of the second reflective sheet 112 and the length L3 of the first black double-sided adhesive sheet 71. Such an arrangement can prevent light leakage through the second reflective sheet 112.

A length L4 of the second black light-shielding adhesive portion 62 is equal to a sum of a thickness of the first reflective sheet 111 and a thickness of the light guiding plate 12. The second black light-shielding adhesive portion 62 is bent upward to form a black wall, thereby preventing the first reflective sheet 112 and the light guiding plate 12 from leaking light.

The via hole region 8 includes a viewing hole region 81, a boundary region 82, and a backlight hole region 83. The arrangement of the present invention makes the boundary region narrower than that of a prior art, making an appearance of the display more aesthetically pleasing.

Second Embodiment

According to still another embodiment of the present invention, a terminal device is provided. The terminal device comprises a body. The liquid crystal display panel of the first embodiment is disposed on the body, wherein a camera module is disposed on the body, and the camera module is disposed under the via hole region of the liquid crystal display panel.

Advantages of the present invention:

The present invention provides a liquid crystal display panel, in which the black double-sided adhesive sheets are added as a support between the films/layers of the backlight module at the via hole region, and the reflective plate is virtually cut to form a circle at the via hole region. The reflective plate is bent upward along a circumference of the cut-out circle, and is bent upward to form a black wall to cover the light guiding plate. This arrangement can avoid light leakage and is simple and easy to carry out, greatly reducing costs and saving production time. In addition, this arrangement makes an overall black matrix very narrow, making the appearance of the display more beautiful.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A liquid crystal display panel, provided with a via hole region and a display region, the liquid crystal display panel comprising:
    a backlight film layer, a lower polarizing sheet, a thin film transistor (TFT) layer, a color filter substrate, and an upper polarizing sheet arranged in sequence, the backlight film layer comprising a reflective plate, a light guiding plate, a light diffusion sheet, a lower brightness enhancing layer, and an upper brightness enhancing layer arranged in sequence, wherein in the via hole region, a black light-shielding adhesive is attached to a lower surface of the reflective plate, the reflective plate comprises a first reflective sheet and a second reflective sheet which is bent upward, the second reflective sheet fixes the backlight film layer by the upward bending of the second reflective sheet, the black light-shielding adhesive comprises a first black light-shielding adhesive portion and a second black light-shielding adhesive portion which is bent upward, and the second black light-shielding adhesive portion is bent upward to form a black wall to cover the light guiding plate.

2. The liquid crystal display panel according to claim 1, wherein in the via hole region, a first black double-sided adhesive sheet is disposed between the light guiding plate and the light diffusion sheet.

3. The liquid crystal display panel according to claim 2, wherein in the via hole region, a second black double-sided adhesive sheet is disposed between the light diffusion sheet and the lower brightness enhancing layer.

4. The liquid crystal display panel according to claim 3, wherein in the via hole region, a third black double-sided adhesive sheet is disposed between the lower brightness enhancing layer and the upper brightness enhancing layer.

5. The liquid crystal display panel according to claim 4, wherein in the via hole region, a fourth black double-sided adhesive sheet is disposed between the upper brightness enhancing layer and the lower polarizing sheet.

6. The liquid crystal display panel according to claim 1, wherein a length of the first black light-shielding adhesive portion is greater than a thickness of the second reflective sheet.

7. The liquid crystal display panel according to claim 2, wherein a length of the first black light-shielding adhesive portion is less than a sum of a thickness of the second reflective sheet and a length of the first black double-sided adhesive sheet.

8. The liquid crystal display panel according to claim 1, wherein a length of the second reflective sheet is equal to a thickness of the backlight film layer.

9. The liquid crystal display panel according to claim 1, wherein a length of the second black light-shielding adhesive portion is greater than a sum of a thickness of the first reflective sheet and a thickness of the light guiding plate.

10. A terminal device, comprising:
    a body, the liquid crystal display panel of claim 1 disposed on the body, wherein a camera module is disposed on the body, and the camera module is disposed under the via hole region of the liquid crystal display panel.

11. The terminal device according to claim 10, wherein in the via hole region, a first black double-sided adhesive sheet is disposed between the light guiding plate and the light diffusion sheet.

12. The terminal device according to claim 11, wherein in the via hole region, a second black double-sided adhesive sheet is disposed between the light diffusion sheet and the lower brightness enhancing layer.

13. The terminal device according to claim 12, wherein in the via hole region, a third black double-sided adhesive is disposed between the lower brightness enhancing layer and the upper brightness enhancing layer.

14. The terminal device according to claim 13, wherein in the via hole region, a fourth black double-sided adhesive sheet is disposed between the upper brightness enhancing layer and the lower polarizing sheet.

15. The terminal device according to claim 10, wherein a length of the first black light-shielding adhesive portion is greater than a thickness of the second reflective sheet.

16. The terminal device according to claim 11, wherein a length of the first black light-shielding adhesive portion is less than a sum of a thickness of the second reflective sheet and a length of the first black double-sided adhesive sheet.

17. The terminal device according to claim 10, wherein a length of the second reflective sheet is equal to a thickness of the backlight film layer.

18. The terminal device according to claim 10, wherein a length of the second black light-shielding adhesive portion is equal to a sum of a thickness of the first reflective sheet and a thickness of the light guiding plate.

* * * * *